Inventor
T. UCHIDA

United States Patent Office 3,402,365
Patented Sept. 17, 1968

3,402,365
MONOCHROMATIC OPTICAL MASER
Teiji Uchida, Tokyo, Japan, assignor to Nippon Electric Company, Limited, Tokyo, Japan, a corporation of Japan
Filed July 14, 1964, Ser. No. 382,539
Claims priority, application Japan, July 19, 1963, 38/38,958
5 Claims. (Cl. 331—94.5)

ABSTRACT OF THE DISCLOSURE

A monochromatic optical maser having a light source for producing a maser light beam within a band of wavelengths has one of its source reflectors, for reciprocating the beam, replaced by an optical system which includes a transmitting-reflecting element angled at the Brewster angle so that the element reflects a first portion of light along a first path and transmits a second portion along a second path. First and second reflectors are positioned in the respective paths to reflect the energy back to the element, the reflectors being spaced in a predetermined distance relationship with respect to the desired wavelength to produce monochromatic light.

---

This invention relates to an optical maser and more particularly to an optical maser including an optical system for providing excellent frequency or wavelength selectivity.

One optical maser proposed in the prior art is disclosed by A. Javan et al. in "Physical Review Letters," volume 6, No. 3, pages 106–110 (February 1961). This known system comprises reflectors each having a multi-layer reflecting film (formed by evaporation of a dielectric material, as described in lines 30–33 of the left-hand side of page 108) for increasing the frequency or wavelength selectivity for the output light wave. However, the wavelength selectivity provided is not good enough and oscillations occur at a plurality of wavelengths, as illustrated in FIG. 13 of a paper contributed by D. R. Herriot in "Journal of Optical Society of America," volume 52, pages 31–37 (January 1962).

If such an optical maser is used in a transmitter, spurious oscillations have been unavoidably radiated in addition to the oscillation which is to be used as the carrier wave. Such oscillations wastefully occupy the carrier-wave band. If such an optical maser is used as a local oscillator in a receiver, spurious intermediate-frequency waves are produced during frequency conversion of the received wave, in addition to the intermediate-frequency wave of the desired frequency. This reduces the efficiency of the intermediate-frequency amplifier and causes other adverse effects in the operation of the amplifier. In order to obviate such drawbacks, it is desirable to make the output light wave produced by an optical maser monochromatic.

The object of the invention is therefore to provide a monochromatic optical maser which generates oscillation of a single wavelength.

Figure 1:
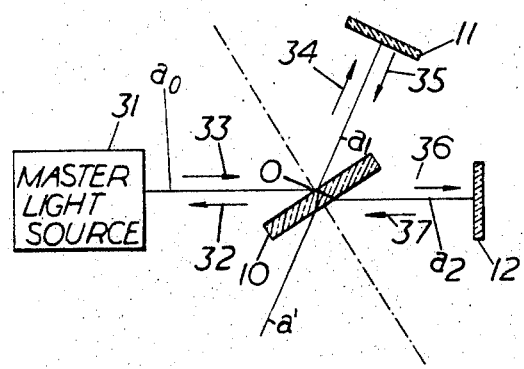

An optical maser according to the invention is of the type illustrated in FIG. 1 of a paper written by W. W. Rigrod et al. in "Journal of Applied Physics," Volume 32, No. 2, page 743 (February 1962). Such a maser comprising a gas discharge tube (which acts as the maser light source) and a pair of plane reflectors are disposed on both sides of the discharge tube. In this invention at least one of the reflectors is replaced by an optical system composed (in the manner to be described hereinafter) of a combination of a semi-transparent plane reflector and two plane reflectors. In other words, the optical maser of the invention makes it possible to provide substantially monochromatic output light waves by increasing the wavelength selectivity of the above-mentioned pair of opposing reflectors thereby to increase the overall wavelength selectivity of the above-described optical system.

Figure 2:
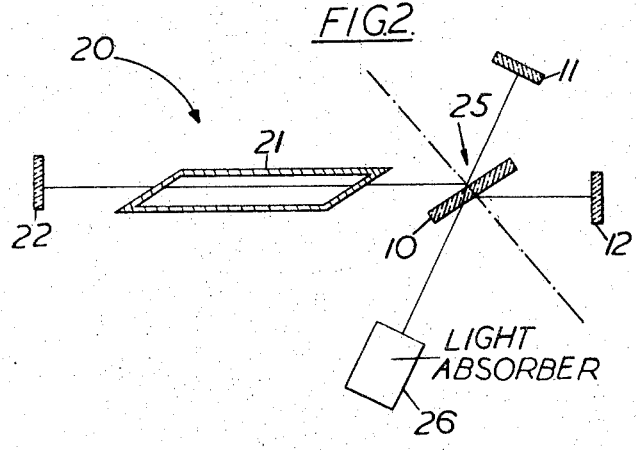

The above-mentioned and other features and objects of this invention and the means of attaining them will become more apparent and the invention itself will be best understood by reference to the following description of embodiments of the invention taken in conjunction with the accompanying drawings in which:

FIG. 1 is a schematic axial sectional view of an optical system for describing the principles of the invention; and FIG. 2 is a schematic axial sectional view of an embodiment of the invention.

Referring to FIG. 1, there is shown therein, an optical system for use with an optical maser. This system is shown schematically in FIG. 1. Referring to FIG. 1, incident light from a gas discharge tube or other maser light source 31 travels along light path $a_0$ in the direction of arrow 33 to fall incident upon a semi-transparent plane reflector 10 at the Brewster's polarization angle which is given by $$\tan A = n$$

(where $n$ is the refractive index of the reflector 10). A portion of this incident light is reflected by the semi-transparent reflecting surface of the semi-transparent reflector 10 and caused to travel along a first path $a_1$ in the direction of arrow 34 to fall incident upon a first plane reflector 11 disposed perpendicular to the first path $a_1$. Meanwhile, the remaining portion of the incident light transmitted along path $a_0$ penetrates the semi-transparent reflector 10 and travels along a second path $a_2$ in the direction of arrow 36 to fall incident upon a second plane reflector 12 disposed perpendicular to the second path $a_2$. The light which has fallen on the first plane reflector 11 is reflected back along the path $a_1$ (as indicated by arrow 35) and a portion thereof is again reflected at the semi-transparent reflector 10 to go back along the incident light path $a_0$ towards the light source as indicated by arrow 32. The other portion of the reflected light from reflector 11 indicated by arrow 35 is transmitted through the semi-transparent reflector 10 to travel along the path $a'$. The light which has fallen on the second plane reflector 12 is reflected backwards along the second path $a_2$ (as indicated by arrow 37) to return to the semi-transparent reflector 10. A portion thereof is transmitted through the reflector 10 to go back along the incident light path $a_0$ as shown by arrow 32. The other portion of light reflected from reflector 12 (as indicated by arrow 37) is reflected by the same semi-transparent reflector 10 to travel along the path $a'$. In order to eliminate any reflection at the transparent surface of the semi-transparent reflector 10 (which is on the surface of reflector 10 which is on the other side of the semi-transparent reflecting surface) the surfaces are arranged so that the incident angle satisfies the condition for the Brewster's polarization angle. Furthermore, the incident light may be forced (by means not shown) to be a lineary polarized light whose electric intensity lies parallel to the plane of the drawing.

Designate the intensity of the incident light along the incident light path $a_0$ as P. Assume the light absorption at the semi-transparent reflector 10, the first and the second plane reflectors 11 and 12, and any other portions of the light paths are negligible and can be neglected. Designate the rate of transmission of the light by the semi-transparent reflector 10 (or the ratio of the intensity of the transmitted light to that of the incident light) as T. Now, if the reflecting rates of the plane reflectors 11 and 12 are both substantially equal to unity, then the intensity of the light which travels along the path $a'$ is given by $(1-T)TP$.

For convenience of analysis, it will now be assumed that the reflecting film of the semi-transparent reflector 10 is a semi-transparent reflecting surface of zero thickness. Furthermore, it will be noted that the phase shift imparted to the transmitted or the reflected light by the semi-transparent reflecting film never exceeds 180°. Therefore, let the phase $A_1$ designate that part of the light along path $a'$ which resulted from reciprocation of light along the first path $a_1$ and let phase $A_2$ designate that part of the output light which resulted from reciprocation of light along path $a_2$ (where $A_1$ and $A_2$ represent the phases of the light) then $A_1$ and $A_2$ (phase shifts) will be given by:

$$A_1 = 2\pi(2d_1/\lambda) + A_R + A + A_T$$
and
$$A_2 = 2\pi(2d_2/\lambda) + A_T + A + A_R;$$

where $d_1$ and $d_2$ represent the optical paths from the point of incidence 0 on the semi-transparent reflecting film of the semi-transparent reflector 10 to the first and the second reflectors 11 and 12, respectively and where $A_R$ and $A_T$ designate the phase shifts caused upon reflection and transmission of the light portions at the semi-transparent reflecting film of the semi-transparent reflector 10, respectively; $A$ is the phase shift introduced by the reflection at either of the first and the second reflectors 11 and 12; and $\lambda$ represents the wavelength of the incident light. More particularly, the above equations state, the phase shift results from the thickness of the semi-transparent reflector 10 (which is converted to a distance in a space whose refractive index is unity) plus the spacing between the concerned reflectors. Incidentally, the difference between the optical paths $d_1$ and $d_2$ may generally be laid within the length of coherence.

If the portions of light appearing at path $a'$ are in phase opposition, they cancel each other because of the above-mentioned equality between their intensities. Thus, the light substantially disappears anywhere along the path $a'$. The phase shifts $A_1$ and $A_2$ must therefore satisfy $$A_1 - A_2 = 2\pi(2d_1/\lambda - 2d_2/\lambda) = (2k+1)\pi \quad (1)$$
or $\qquad 2d_1 - 2d_2 = (2k+1)\lambda/2$
or $\qquad (d_1 - d_2)/\lambda = k/2 + \frac{1}{4} \quad (1')$ where $k$ is an integer. When Equation 1 holds and if there is no leakage of light along the path $a'$, then the light returning by way of the first reflector 11 to the incident light path $a_0$ has a phase shift $A_1'$ as follows:

$$A_1' = 2\pi(2d_1/\lambda) + 2A_R + A$$

and an intensity $(1-T)^2P$. At the same time the light returning by way of the second reflector 12 to the incident light path $a_0$ has a phase shift $A_2'$ as follows:

$$A_2' = 2\pi(2d_2/\lambda) + 2A_T + A$$

and an intensity $T^2P$. If the loss of light in the light paths is negligible and Equation 1 holds, then according to the principle of conservation of energy the intensity of the reflected light traveling back along the incident light path $a_0$ (in the direction of arrow 32) must be equal to the intensity $P$ of the incident light traveling in the direction of arrow 33. The principle of conservation of energy holds for the vector sum of the two components of the reflected light whose intensities as noted above are $(1-T)^2P$ and $T^2P$. Thus:

$$A_1' - A_2' = 2\pi(2d_1/\lambda - 2d_2/\lambda) + 2A_R - 2A_T = 2l\pi \quad (2)$$

where $l$ is an integer. From Equations 1 and 2, the phase shifts $A_T$ and $A_R$ therefore must satisfy the relation:

$$A_T - A_R = (2m+1)\pi/2 \quad (3)$$

where $m$ is an integer.

For wavelengths satisfying Equation 1' above, the optical system illustrated in FIG. 1 is equivalent to a virtual plane reflector which does not impart a phase shift to the reflected light and which is disposed perpendicularly to the direction of incidence of the incident light and spaced from the center of the semi-transparent reflecting film of the semi-transparent reflector (towards the above mentioned direction of incidence) by an optical path $d_1$ given by Equation 4a below or to another virtual plane reflector disposed in the light path in the manner mentioned but spaced by another optical path $d_2$ given by the Equation 4b as follows:

$$d_1' = d_1 + [A_R/(2\pi)]\lambda \quad (4a)$$
and $\qquad d_2' = d_2 + [A_T/(2\pi)]\lambda \quad (4b)$ where the phase shifts $A_R$ and $A_T$ appearing in Equations 4a and 4b must satisfy Equation 3. As a matter of fact, the factors $A_R/(2\pi)$ and $A_T/(2\pi)$ which are introduced to the respective optical paths upon reflection and transmission are negligible as compared with the optical paths $d_1$ and $d_2$. Therefore, the paths $d_1'$ and $d_2'$ are approximately equal to the paths $d_1$ and $d_2$, respectively.

For wavelengths which satisfy the relation 1', the equivalent optical system mentioned above may be either of the virtual plane reflectors 11 and 12 spaced from the center point 0 of the semi-transparent reflecting film by optical paths $d_1'$ and $d_2'$, respectively. For the sake of simplicity, the plane reflector 11 will be referred to in the following description. However, it should be understood that the discussion is also applicable to reflector 12.

If the light components appearing on path $a'$ are in phase, then they will intensify each other, and the light along path $a'$ will have considerable intensity. This condition therefore, can be expressed in a manner similar to Equation 1' above (wherein like symbols have the same meaning) as follows:

$$2d_1 - 2d_2 = 2k\lambda/2$$
or $\qquad (d_1 - d_2/\lambda = k/2 \quad (5)$

If Equation 5 holds, the intensity of the total light appearing along the path $a'$ is equal to the vector sum of the components as follows:

$$(\sqrt{1-T)TP} + \sqrt{T(1-T)P})^2 = 4T(1-T)P$$

If the wavelength of the incident light satisfies Equation 1 for given optical paths $d_1$ and $d_2$ (and consequently substantially no light appears along paths $a'$) then no light of the wave length $\lambda$ leaks out of the optical system. Therefore, the rate of light reflection by the equivalent optical system is a maximum at the wavelength $\lambda$. However, when the wavelength of the incident light differs slightly from the wavelength $\lambda$ then Equation 1 no longer holds, and the light leakage along path $a'$ occurs to markedly reduce the reflection caused by the equivalent optical system. Thus, the optical system of this invention provides wavelength or frequency selectivity, which will be discussed hereinafter.

As will now be clear, this invention provides a novel optical system for an optical maser. The system, provides high wavelength or frequency selectivity. The system is composed of a semi-transparent reflector and two plane reflectors which are disposed relative to one another with respective spacings and orientation determined to provide the desired results. The system acts as an equivalent reflector as indicated in the paragraph immediately preceding Equations 4a and 4b hereinabove.

Referring now to FIG. 2 which shows another embodiment of the invention wherein an additional reflector 22 (which is an equivalent reflector) is used in the optical maser device. The optical maser device 20 of this embodiment includes a cylindrical gas discharge tube 21 having a window attached (in the manner illustrated in FIG. 1 on page 745 of the previously cited Rigrod et al. paper) to each end thereof and forming the Brewster polarization angle with the direction of the generated light beam. A plane reflector 22 is disposed perpendicular to the axis of the discharge tube 21 and spaced from one of the ends thereof to intercept light from the tube. A reflector assembly 25 (which is composed according to the princples mentioned above) is disposed opposite the other end of the discharge tube 21. A light absorber 26 is disposed transversely of that light path of the reflector assembly 25 which corresponds to the path $a'$.

It is assumed in the optical system of FIG. 2 that the reflectors 11, 12, and 22 are ideal metal reflecting surfaces which reflect the light with a phase shift of 180°. The resonance wavelength of the entire optical maser device is (as derived from Equation 7.1 on page 38 of the book entitled "Lasers," written by B. A. Lengyel and published by John Wiley Sons, Inc., New York, 1962) the wavelength λ which is given by:

$$(d_1'+d)/\lambda = (d_1+d)/\lambda + A_R/(2\pi) = k/2 \quad (6)$$

where $d$ is the optical path between the points of incidence of the light onto the semi-transparent reflecting film and the plane reflector 22 and where the remaining symbols are the same as those in Equation 1. If the wavelength of the light generated by the discharge tube 21 is even a bit different from the value given by Equation 6, Equations 1 and 6 no longer hold, and the output light power decreases sharply for these different wavelengths. Thus, the optical maser device of the embodiment exhibits excellent wavelength or frequency selectivity.

Howevr, it should be noted that if the optical path between a pair of plane reflectors which are disposed at opposite ends of a gas discharge tube is designated D, and if the light velocity is designed c, then the resonance wave length of the system is given by:

$$D/\lambda = k/2$$

which is similar to Equation 6. Modifying this equation by multiplying the denominator and the numerator of its left-hand side by the frequency $f$, provides the following equation:

$$fD/(f\lambda) = fD/c = k/2$$

which can be rewritten as:

$$f = [c/(2D)] \cdot k$$

where $f$ is the resonance frequency. Inasmuch as this relation gives the pitch frequency or the frequency interval of the spurious oscillations when the integer $k$ is unity, $$f_{p1} = c/(2D) \quad (7)$$

gives the pitch frequency $f_{p1}$. By applying general Equation 7 to the optical maser device of FIG. 2, it will be seen that $$f_{p1} = c/[2(d+d_1')] \quad (8)$$

gives the pitch frequency $f_{p1}$ of this optical maser device. Incidentally, the optical maser device described in the previously cited Rigrod et al. paper has a spectrum width of about 1000 mc. with the center frequency corresponding to the center wavelength of 1.153 microns, and consequently generates output light containing oscillation components distributed within the spectrum width at every frequency interval given by Equation 7.

As has been explained, a reflector assembly according to the principles described above is equivalent to either one of the reflectors 11 and 12 being spaced by the optical paths $d_1$ and $d_2$, respectively, from the point 0 of incidence on the semi-transparent reflector 10. With such a system the spurious oscillations are generated thereby at frequency intervals which are defined by another pitch frequency $f_{p1'}$ which is given by $$f_{p1'} = c/[2(d+d_2')] \quad (8')$$

in addition to the pitch frequency $f_{p1}$ given by the Equation 8. Inasmuch as the optical paths $d_1'$ and $d_2'$ are both considerably smaller than the path $d$, the right-hand sides of the equations 8 and 8' are nearly equal to each other so that equation 8" holds as follows:

$$f_{p1} \doteq f_{p1}' \doteq c/(2d). \quad (8'')$$

It should be noted that the quality factor Q (or the reciprocal of loss of the resonance system) reached a maximum value at the center frequency $f$ which corresponds to the wavelength λ given by Equation 1. The frequency $f_{p2}$ peaks between the adjacent frequencies at which the quality factor reaches lower maximum peaks above and below the center frequency and is given by the following equation:

$$f_{p2} = c/(2|d_1-d_2|) \quad (9)$$

which is derived from Equation 5 (rather than Equation 1), in a manner similar to the derivation of Equation 7 (i.e. by multiplying the denominator and the numerator of the left-hand side of the relation 5 with the frequency $f$).

If the spacings between the reflectors are selected to simultaneously satisfy equations 1 and 6 for a particular frequency $f=c/\lambda$ within the resonance spectrum band of the oscillations of the light source containing the optical maser material, then the frequency interval $f_{p1}$ of the spurious oscillations produced about the center frequency $f$ by the optical maser device differs (as shown by Equations 8 and 9) from the frequency interval $f_{p2}$ of those points distributed around the same center frequency $f$, at which the quality factor Q reaches the lower maxima thereby producing considerable loss to oscillations having a frequency interval $f_{p1}$ in the proximity of (and with the exception of) the center frequency $f$. Consequently it is only possible to derive the oscillation of the center frequency $f$.

In the above-described embodiment, the invention has been explained in conjunction with a gas maser wherein the gas discharge tube serves as the source having the maser action. It is to be noted, however, that the invention is also applicable to an optical maser device wherein use is made of a solid maser substance like the optical maser device illustrated in FIG. 1 on page 3139 of "Journal of Applied Physics," Volume 33, No. 10.

As regards the above-explained embodiment, no description has been made as to how the output light is extracted. Most preferably, the reflecting power of the plane reflector is in the order of 98% and that light is used as the output light which is transmitted based on the rate of transmission of the remaining 2 percent. Although it is not impossible to use as the output light the light transmitted through either of the reflectors 11 and 12 arranged in the manner mentioned, the output light is most conveniently taken out through the reflector 22.

Also, in the embodiments described only one of a pair of reflectors disposed on both ends of the gas discharge tube has been the reflector assembly based on the previously mentioned principles. However, it will be understood that both of the reflectors may be reflector assemblies, as described. However, when two such assemblies are provided it will be difficult in practice to precisely adjust the optical paths in and between these reflector assemblies.

Each of the reflecting films of the reflectors 10, 11, 12 and 22 may be a metal reflecting surface formed by evaporation of silver or aluminum and is preferably a multilayer dielectric reflecting film referred to on lines 30–33 left-hand column, page 108 of Javan et al. article mentioned heretofore. Furthermore, as will be clear from the above-mentioned paper of Rigrod et al., particularly FIG. 1 and the related explanation, each of the reflectors 11, 12, and 22 may be replaced by a concave mirror.

When the rate of transmission of the semi-transparent reflector 10 is set at 50 percent, the wavelength selectivity of the reflector assembly according to the principles of this invention reaches a maximum. In helium-neon optical maser devices, the rate of transmisison has been set at some 5–15 percent in order to facilitate easy adjustment.

While I have described above the principles of my invention in connection with specific embodiments, it is to be clearly understood that this description is made only by way of example and not as a limitation to the scope of my invention as set forth in the objects thereof and in the accompanying claims.

What is claimed is:
1. In a monochromatic optical maser device comprising a maser light source for producing a maser light beam within a band of wavelength including a wavelength $\lambda$, and a pair of reflector means disposed at opposing ends of said light source for reciprocating the generated light beam, the improvement wherein at least one of said reflector means is replaced by an optical system including:
  (1) a light transmitting-reflecting element positioned so that the normal to said element and the incident maser light falling thereon form an angle equal to the Brewster polarization angle, said element;
    (a) reflecting a first portion of said incident light along a first optical path,
    (b) and transmitting therethrough along a second optical path, a second portion of said incident light,
  (2) a first and a second reflector respectively positioned in said first and second paths for respectively reflecting said first and second portions of light back to said element, said first and second reflectors being respectively spaced from said element by optical distance $d_1$ and $d_2$, which are preselected to satisfy the relation:

$$(d_1-d_2)/\lambda = k/2 + 1/4$$

where $k$ is an integer.

2. An optical maser device as set forth in claim 1 wherein said maser light source emits said maser light in two directions which are separated from each other by substantially 180° and wherein a first optical system is positioned to intercept the light emitted in one of said directions, and wherein said transmitting-reflecting element is a semi-transparent reflector.

3. An optical maser device as set forth in claim 2 further comprising a third reflector positioned to intercept the light emitted from said source in the other of said directions, said third reflector transmitting therethrough only a part of the light and reflecting back to said source substantially all other part of the light, whereby said former part is extracted as an output light of said device.

4. An optical maser as set forth in claim 2 wherein a reflecting material is provided on at least one of said first and second reflectors which material transmits only a part of the light therethrough and reflects substantially all other part of the light, whereby said former part is extracted as an output light of said device.

5. An optical maser as set forth in claim 4 wherein a second optical system is positioned to intercept the light emitted from said source in the other of said directions.

References Cited
UNITED STATES PATENTS 3,277,392 10/1966 Nicolai _____ 331—94.5
3,267,804 8/1966 Dillon _____ 331—94.5

JEWELL H. PEDERSEN, *Primary Examiner.*
B. LACOMIS, *Assistant Examiner.*